Patented Aug. 1, 1944

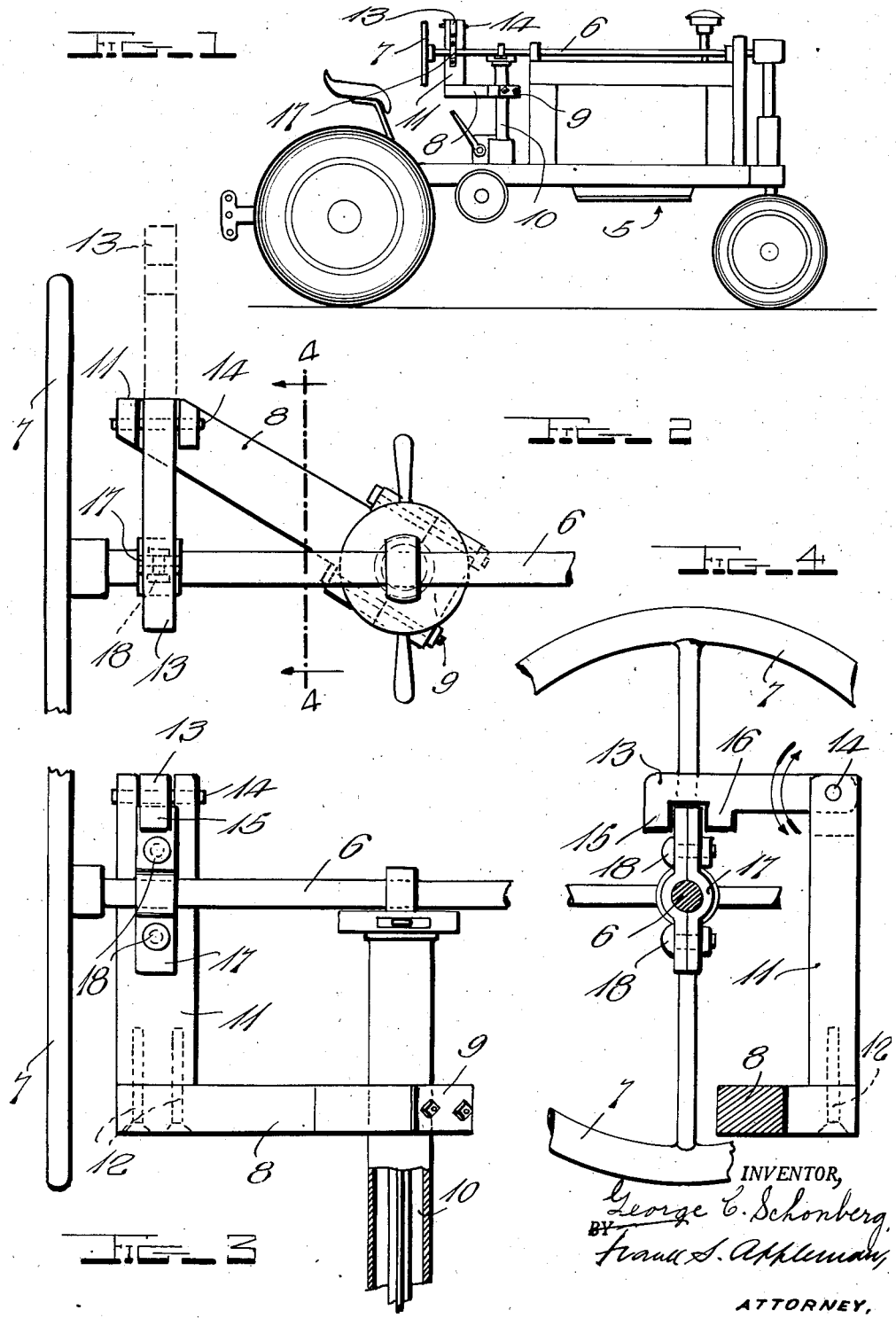

2,354,883

UNITED STATES PATENT OFFICE 2,354,883

ATTACHMENT FOR TRACTORS

George C. Schonberg, Fargo, N. Dak.

Application March 13, 1944, Serial No. 526,266

2 Claims. (Cl. 74—495)

This invention relates to attachments for tractors or the like, in which means are provided for holding the steering mechanism of a tractor so that a course set by the adjustment may be maintained without attention of the driver or operator.

It is an object of this invention to provide means associated with a tractor steering mechanism which will hold the steering shaft against movement after it is adjusted; means being provided for releasing the holding means when the steering wheel is to be manipulated.

It is a further object of this invention to provide means attached to a steering post of a tractor, operative to hold a latch or arm which is swingingly mounted to engage an element on a steering shaft, whereby the steering shaft is held against rotation when the operator is otherwise engaged.

It is a still further object of the invention to provide an attachment of the character indicated which is simple in construction and efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which:

Figure 1 illustrates a view in elevation showing the steering shaft holder mounted on a tractor;

Figure 2 illustrates a plan view thereof;

Figure 3 illustrates a view in side elevation of a fragment of the tractor; and

Figure 4 illustrates a sectional view on the line 4—4 of Fig. 2.

In the drawing 5 denotes a tractor of conventional type having a steering shaft 6 with a steering wheel 7.

An arm 8 has a clamp 9 by which it is secured to the steering post 10 of the tractor, and it is shown that the arm extends diagonally rearwardly and supports a post 11 which is secured to the arm by fastenings, such as screws 12. A latch or arm 13 is oscillatively mounted on the post through the use of a pivot 14 extending through the post near its upper end, and the said latch has spaced lugs 15 and 16 between which the ends of a clamp 17 are seated when the arm is swung to a horizontal position in which it is shown in Figure 4 with one end of the clamp between said lugs; it being also shown that the clamp 17 is secured to the steering post by the bolts 18. Thus, when the steering wheel is moved to cause the tractor to move on a certain course or direction, the steering shaft may be held to maintain that direction of travel through the engagement of the arm with the clamp; it being of course obvious that when the clamp is swung outwardly, according to the arrows of Fig. 4, the steering shaft will be released for manipulation under the influence of the steering wheel.

I claim:

1. An attachment for tractors comprising an arm having means of attachment to a steering post of a tractor for holding the arm approximately horizontally, a post anchored to the end of the arm remote from the steering post, a latch pivotally mounted on the post in position to coact with a member on the steering shaft of the tractor, and a member comprising two sections having portions embracing the steering shaft and having ends projecting on each side of the steering shaft to be engaged by the latch in two positions of adjustment, and means for securing the members together.

2. An attachment for tractors comprising an arm having means of attachment to a steering post of a tractor for holding the arm approximately horizontally, a post anchored to the end of the arm remote from the steering post, a latch pivotally mounted on the post and having spaced lugs in position to coact with a member on the steering shaft of the tractor, and a member clamped to the steering shaft, said member comprising two plates having recesses to receive a steering shaft, means extending through the said members on two sides of the steering shaft for clamping the members to the steering shaft the ends of which are engaged by the lugs of the latch to prevent rotation of the steering shaft.

GEORGE C. SCHONBERG.